United States Patent [19]
Lewicki, Jr. et al.

[11] Patent Number: 5,347,296
[45] Date of Patent: Sep. 13, 1994

[54] ELECTROGRAPHIC PROCESS FOR PRODUCING AN IMAGE WITH DEPTH PERCEPTION AND RESULTING STRUCTURE

[75] Inventors: Walter J. Lewicki, Jr., Lancaster, Pa.; John H. Bowers, Clarksburg, N.J.

[73] Assignee: Armstrong World Industries, Inc., Lancaster, Pa.

[21] Appl. No.: 14,744

[22] Filed: Feb. 8, 1993

Related U.S. Application Data

[60] Continuation-in-part of Ser. No. 769,470, Oct. 1, 1991, Pat. No. 5,187,501, and a continuation-in-part of Ser. No. 862,069, Apr. 2, 1992, abandoned, which is a division of Ser. No. 510,067, Apr. 17, 1990, Pat. No. 5,162,179.

[51] Int. Cl.⁵ .................... G01D 15/06; G03G 13/14
[52] U.S. Cl. .................... 346/153.1; 430/126
[58] Field of Search ............. 346/1.1, 153.1; 430/126

[56] References Cited

U.S. PATENT DOCUMENTS

| | | | |
|---|---|---|---|
| 4,504,837 | 3/1985 | Toyoda et al. | 346/1.1 |
| 4,916,007 | 4/1990 | Manning et al. | 428/203 |
| 5,169,704 | 12/1992 | Faust et al. | 428/143 |

Primary Examiner—George H. Miller, Jr.
Attorney, Agent, or Firm—James J. Ralabate

[57] ABSTRACT

This invention involves a process for producing in an electrographic system a product having an image depth perception. The process includes dispensing in a system a first dielectric layer and electrographically imaging this layer and developing the image. A second dielectric layer is subsequently dispersed in the system, imaged and developed. A preselected plurality of dielectric layers may be imaged and developed. These developed layers are superimposed and adhered together to form a multilayered substrate having a depth perception. The layers can be superimposed, adhered together and overcoated either before or after separation from the system.

19 Claims, 7 Drawing Sheets

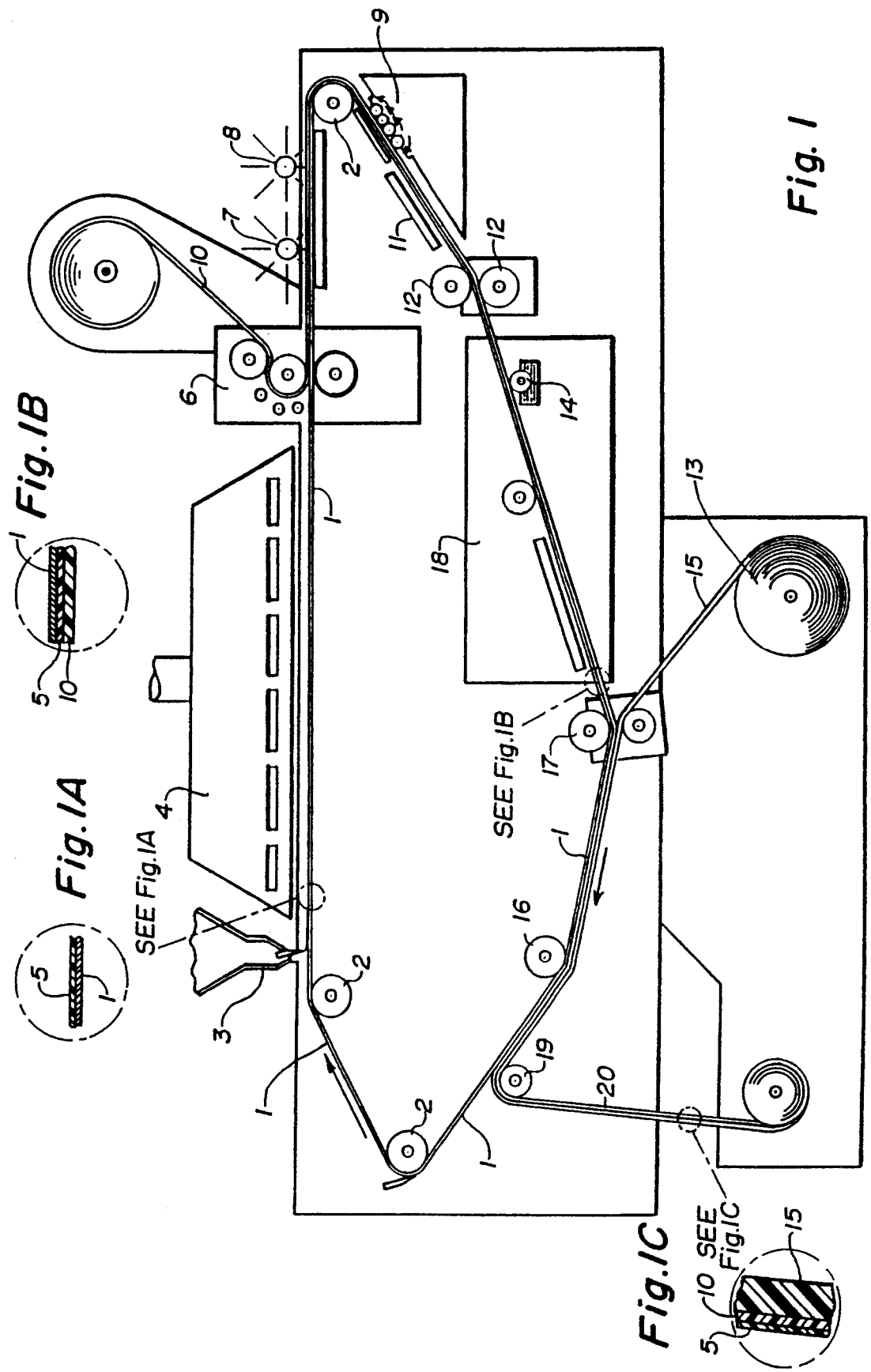

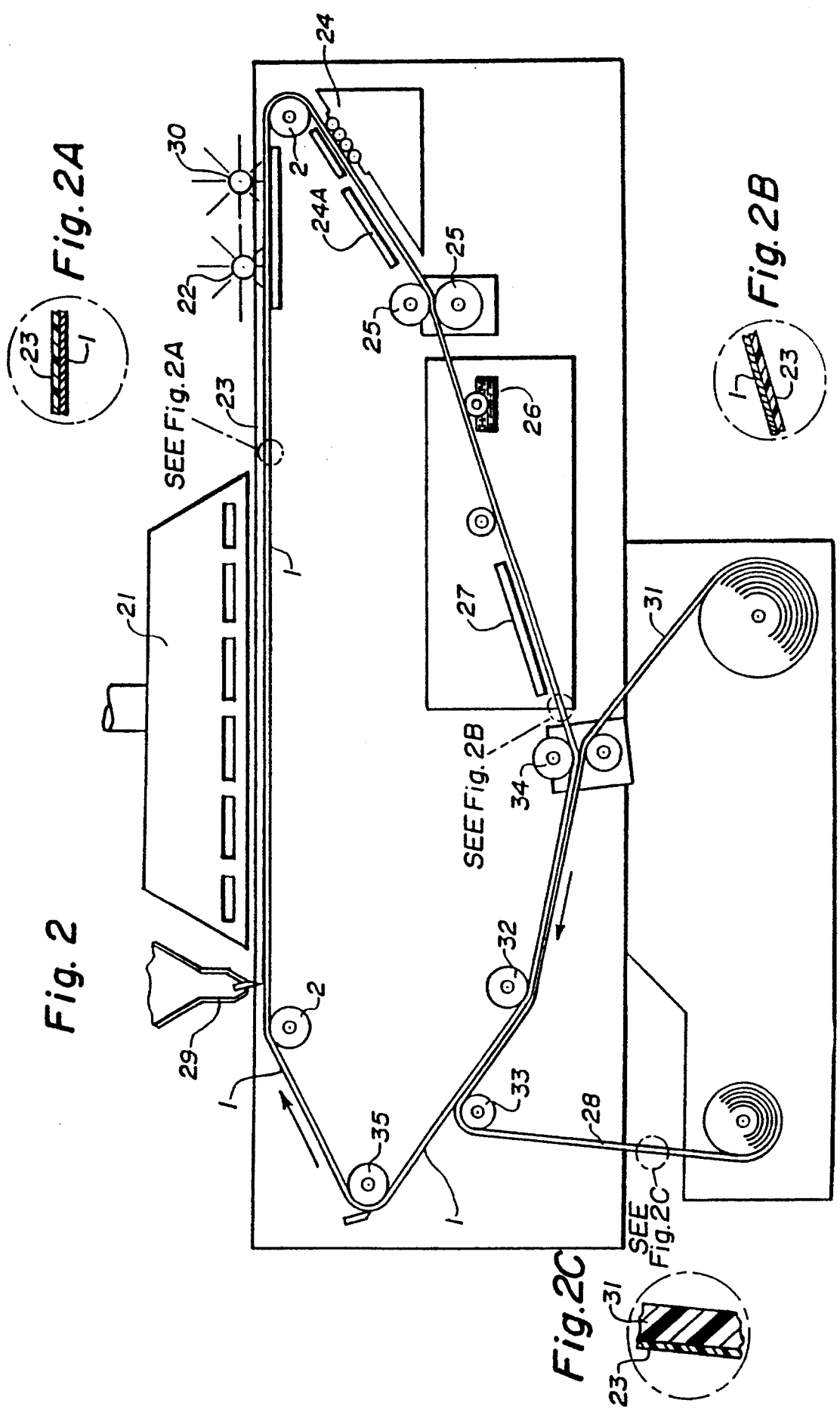

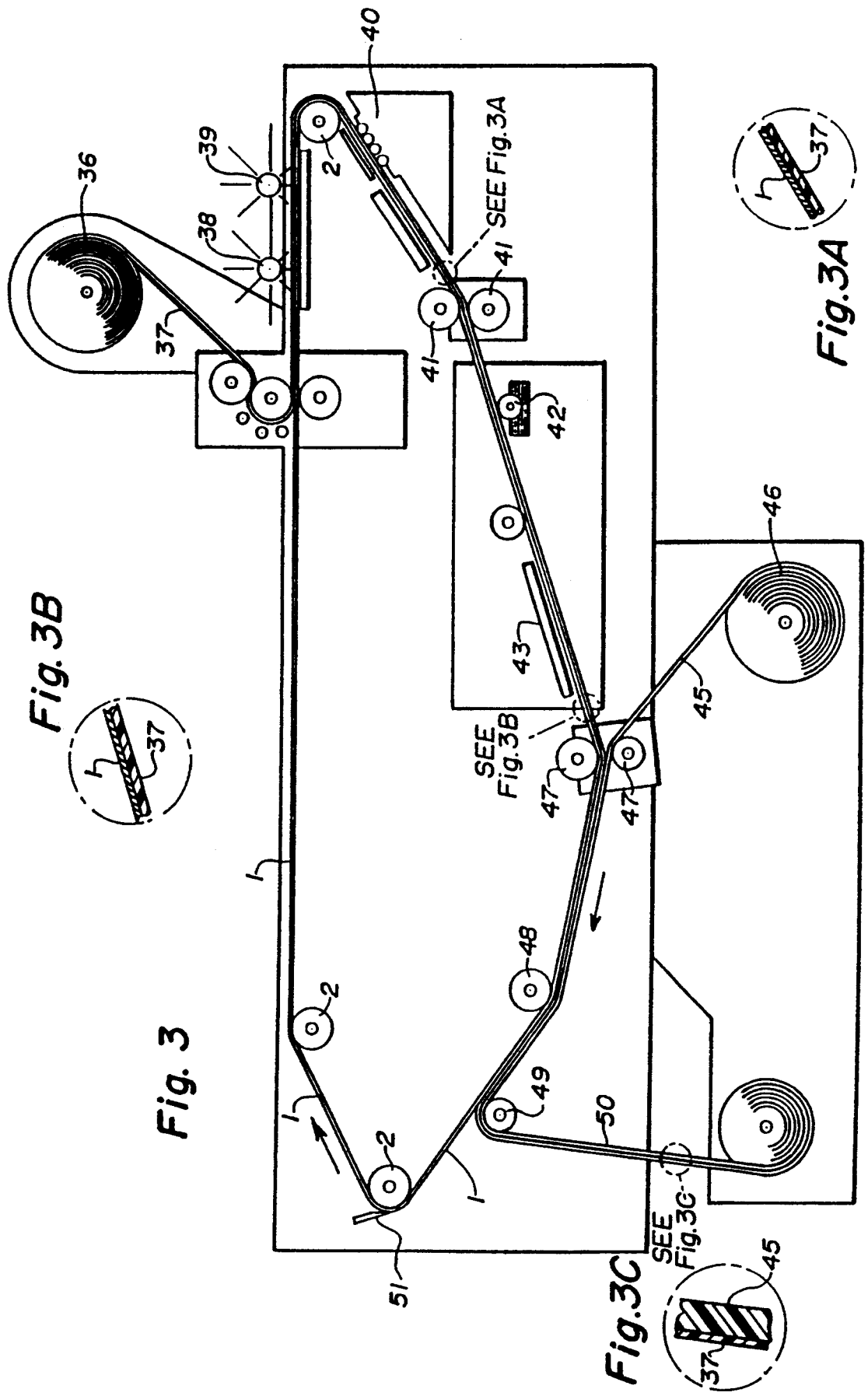

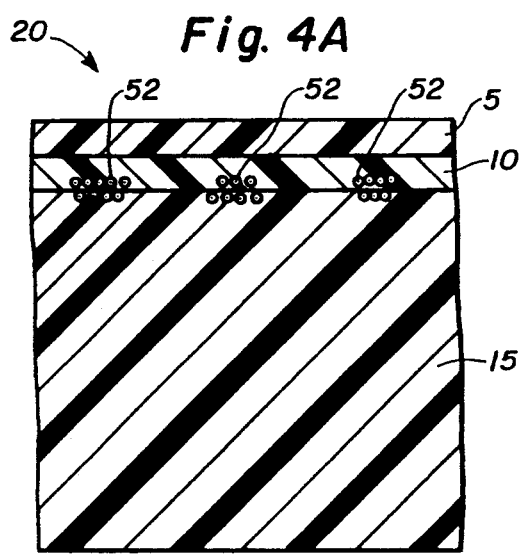
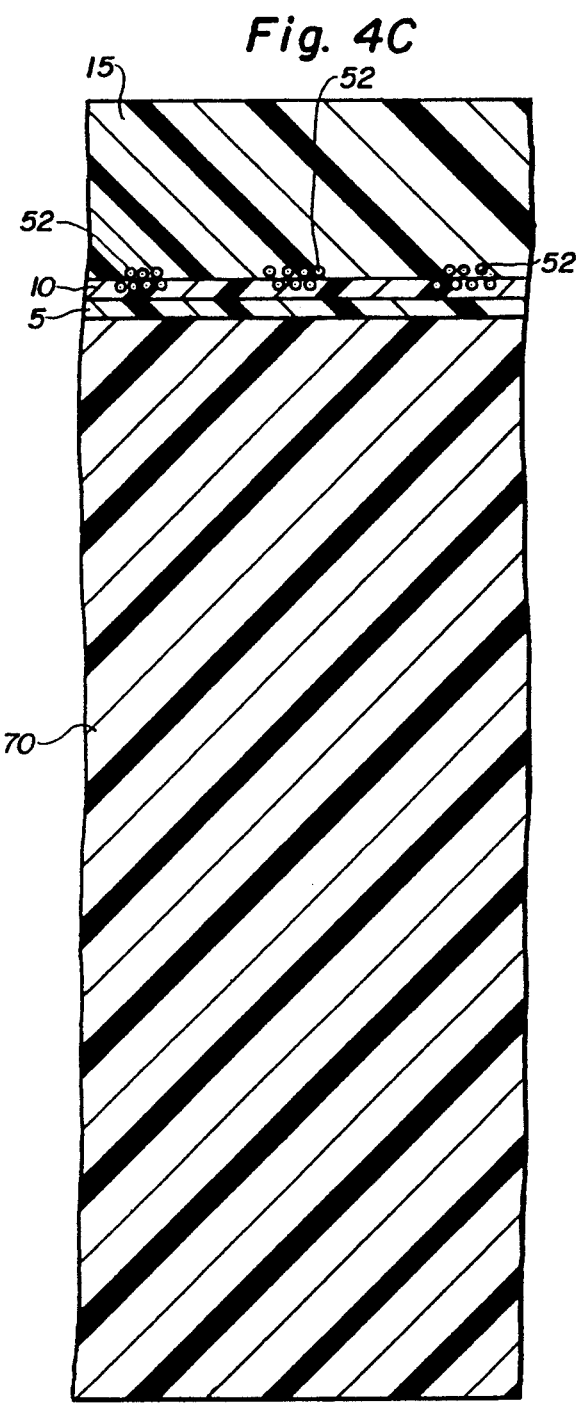
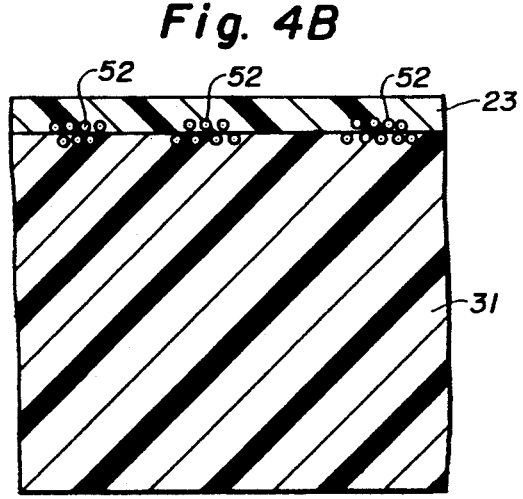

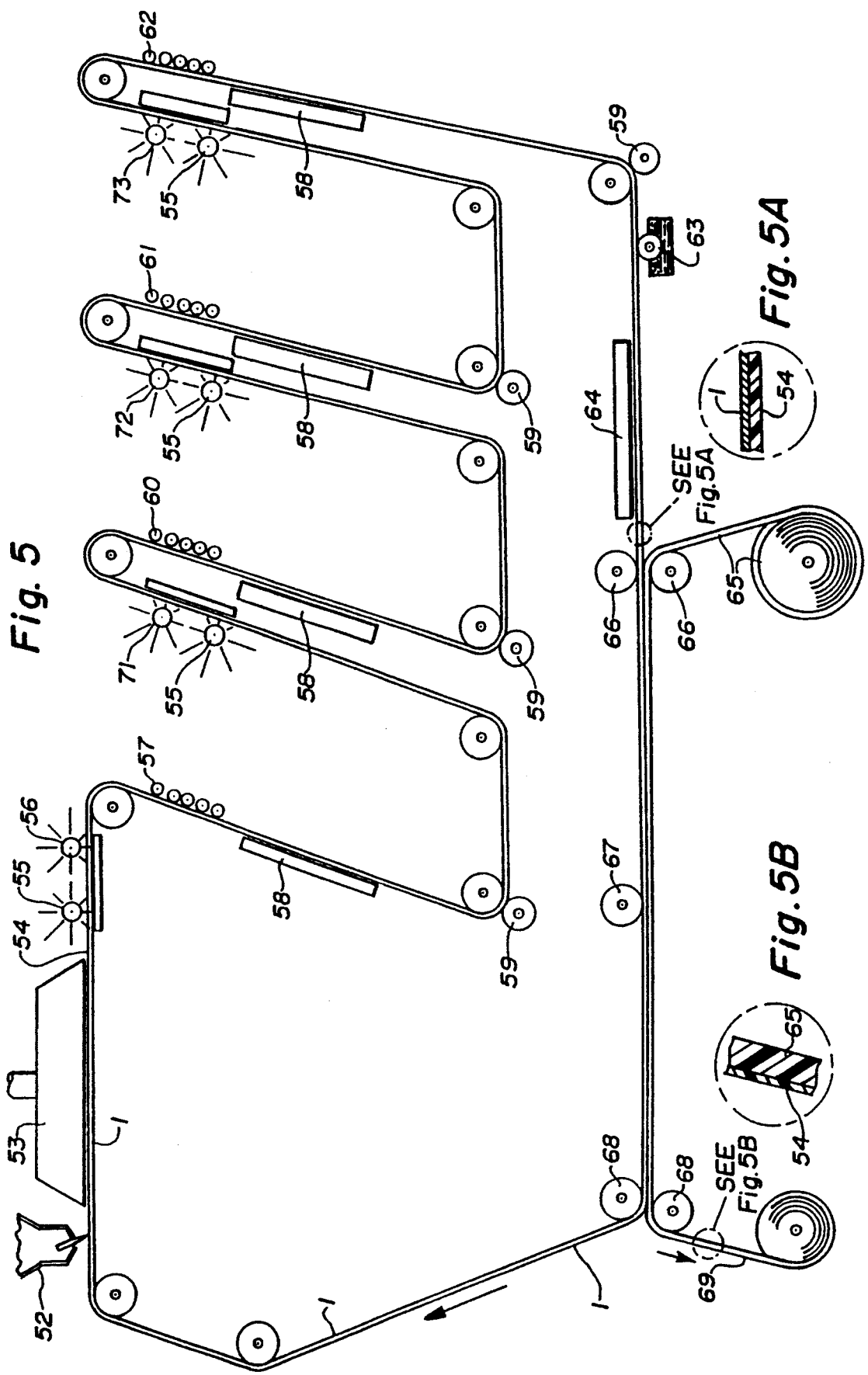

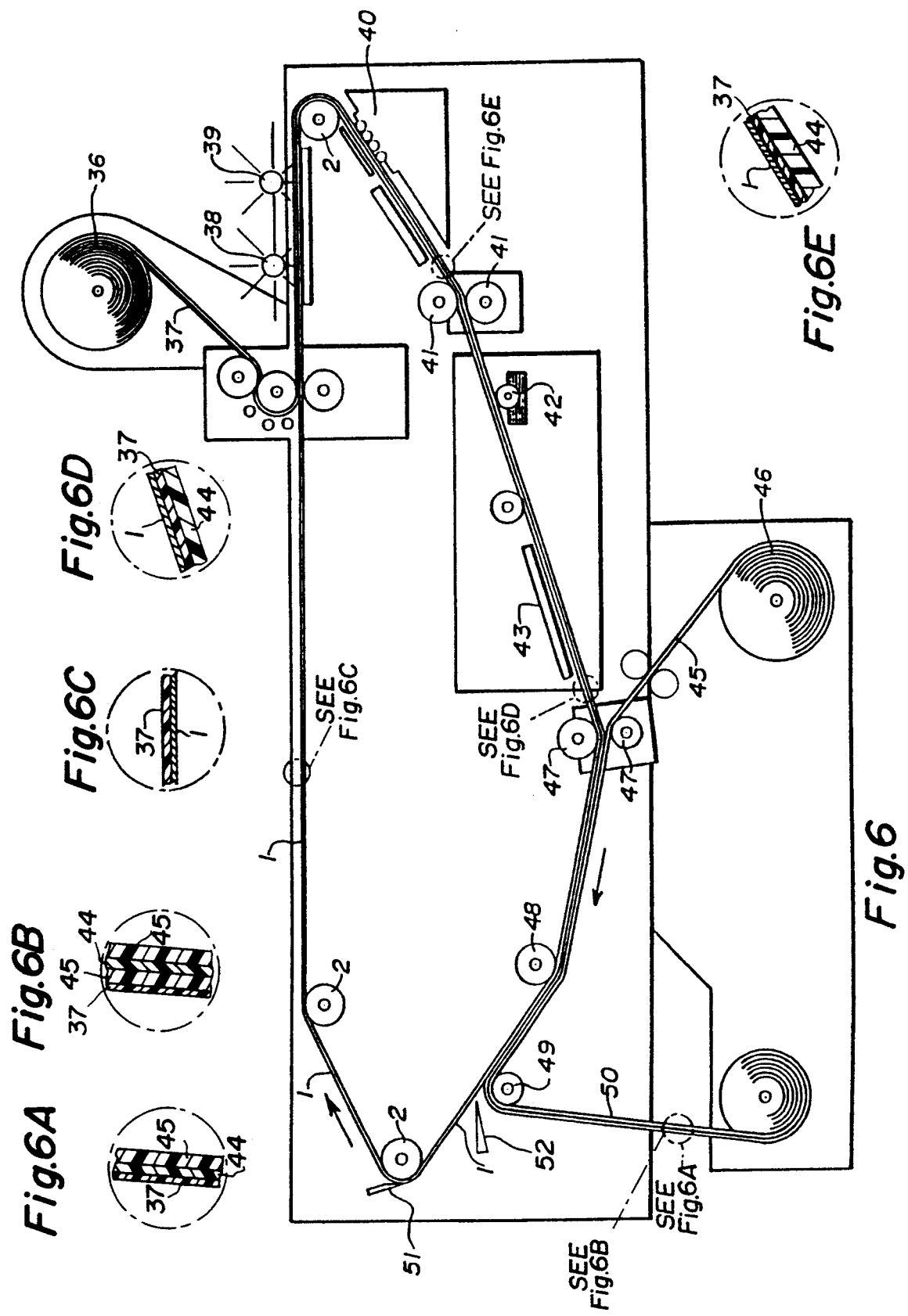

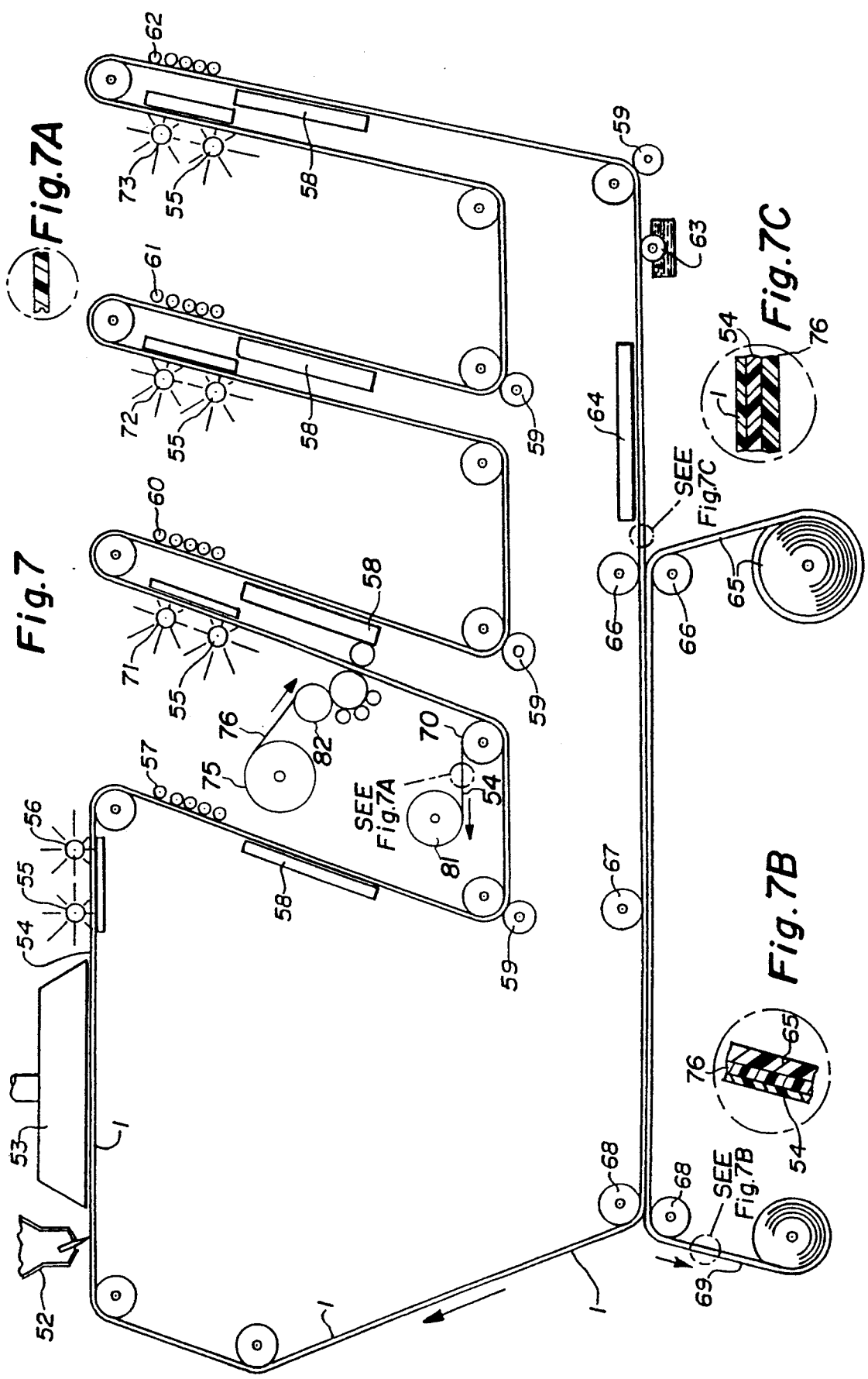

ELECTROGRAPHIC PROCESS FOR PRODUCING AN IMAGE WITH DEPTH PERCEPTION AND RESULTING STRUCTURE

This invention relates to a novel imaging process and structure and, more particularly, to an ion projection process and a structure produced by said process. This application is a Continuation in Part application of Ser. Nos. 07/769,470 filed Oct. 1, 1991 U.S. Pat. No. 5,187,501, and Ser. No. 07/862,069 filed Apr. 2, 1992 abandoned which is a Divisional application of parent application Ser. No 07/510,067 filed Apr. 17 1990, U.S. Pat. No. 5,162,179.

BACKGROUND OF THE INVENTION

Systems using ion projection technology are well known in the art . These systems use an electrostatic charge pattern which corresponds to a desired image. This imagewise charge is deposited upon the dielectric surface of a drum or belt. This surface bearing the latent electrostatic image is moved through a developer station where a toning material of opposite charge adheres to the charged areas of the dielectric surface to form a visible image. The drum or belt is advanced forward and the toned image is either transferred to a receiving media or fused directly on the dielectric surface. After the fusing operation in the transfer system, the dielectric can be treated in various ways to clean its surface of residual charge or toner or both. This cleaning can be performed by any known electrostatic cleaning method.

In imaging and printing processes, both photoconductive insulators and dielectrics have been used; however, they are quite different from each other. Photoconductive insulators will only hold an electrical charge in the dark which makes them useful in limited applications such as copiers and the like. Dielectrics, on the other hand, can hold an electrical charge in the presence of visible light which makes them much more practical for use in commercial manufacturing processes such as the present invention. There are also known many electrostatic printing systems such as those described in U.S. Pat. Nos. 3,023,731 (Schwertz): 3,701,996 (Perley); 4,155,093 (Fotland); 4,267,556 (Fotland); 4,494,129 (Gretchev); 4,518,468 (Fotland); 4,675,703 (Fotland); and 4,821,066 (Foote). All of these systems disclose non-impact printing systems using electrostatic images that can be made visible at one or multiple toning stations. In those systems ions are projected from an ion-generating means onto the surface of a dielectric layer by a print head such as described by Fotland in U.S. Pat. No. 4,155,093 or in U.S. Pat. No. 4,267,556. Generally, the print head comprises a structure of two electrodes separated by a solid dielectric member, a solid dielectric member and a third electrode for the extraction of ions. The first electrode is a driver electrode and the second is a control electrode: both are in contact with the separating dielectric layer. There is an air space at a junction of the control electrode and the solid dielectric member. A high voltage high frequency discharge is initiated between the two electrodes creating a pool of negative and positive ions in the air space adjoining the control electrode. The ions are extracted through a hole in the third electrode by an electrostatic field formed between the second and third electrodes. In Fotland 4,267,556 the image-forming ion generator takes the form of a multiplexed matrix of finger electrodes and selector bars separated by a solid dielectric member. Ions are generated at apertures in the finger electrodes at matrix crossover points and extracted to form an image on a receiving member. While prior art ion projection heads are useful in many applications, they are not adapted for use in systems requiring a relatively thick and hence low capacitance dielectric imaging layer. Grey scale control is achieved by pulse width modulation of the second (finger) electrode as described by Weiner U.S. Pat. No. 4,841,313 Ser. No. 07/540,029. Generally, in electrography, liquid development systems are best suited to accurate rendition of grey scale images and high resolution development. The components of toner systems can contaminate the electrodes in prior art ion projection heads and can render them substantially non-functional. Incorporation of an air knife prior to the ion projection head can reduce the exposure of the head to contamination. The air knife will prevent exposure of the ion projection head to toner particles and the solvents in liquid toners by purging the space around the ion projection head with solvent free air or gas. Prior art ion projection heads are not only not particularly desirable for grey scale printing, but have substantial limits concerning the number of grey scales that can be achieved. For example, most can manage to achieve only a maximum of 4 grey scales. Improved novel ion projection heads are required to provide acceptable results in systems in which a wide range of provide scale reproduction is required. Generally, liquid development systems are required for accurate rendition of grey scale images.

In addition to the deficiencies in prior art print heads, the known electrographic printing systems are not specifically designed to accommodate multicolored printing processes at rapid speeds. Therefore, while ion-generating systems utilize inherently sound technology, there are several major improvements that need to be found before these systems can be used to produce multicolored final products of high print quality and at rapid speeds.

SUMMARY OF THE INVENTION

It is therefore an object of this invention to provide an ion projection process and its resulting product that are devoid of the above-noted disadvantages.

Another object of this invention is to provide a high quality imaged dielectric layer that can be used as a component in final products of varying thicknesses.

Still a further object of this invention is to provide a novel high quality continuous tone product prepared by a novel ion projection process.

Still another object of this invention is to provide a process that is capable of producing multicolored images having the perception of depth.

Yet still a further object of this invention is provide a rapid non-impact process for the production high quality materials of relatively thicker dimensions than heretofore possible.

Still yet another object of this invention is to provide a high quality imaged dielectric layer that can be used by itself or together with other layers as a final product.

The foregoing objects and others are accomplished according to this invention by providing a system using dielectric imaging layers having a substantially thicker cross section and lower capacitance than those of the art. Since the capacitance of the dielectric can be substantially lower from the capacitance of those generally used in the prior art, novel method modifications were required to accommodate the dielectric layer. The prior art print heads as above noted used could not be used in the present invention because the number of ions deposited per RF cycle is too great. The novel print head used in this invention is used in a nitrogen or other inert atmosphere where exothermic reactions during ionization in air are prevented thereby reducing substantially the operating temperature of the print head. This increases the longevity of the print head and provides improved performance. Any other suitable means to deposit a latent electrostatic image other than a print head may be used in the present invention. Also, the air knife used in the present system with the ion projection head will prevent exposure of the ion projection head of solvents in liquid toners by purging the space between the ion projection head and the substrate with air or nitrogen. Since the imaged dielectric layer is to be removed after image fixing, precaution was needed to ensure a minimum of shrinkage of the layer and distortion thereby of the image. To prevent shrinkage or to hold shrinkage to acceptable levels, an overcoating of a clear resin is laminated onto the imaged surface of the dielectric. This laminated overcoating can have a thickness of at least 0.2 mils and provides image stability to the fixed colored image. In some applications such as floor tile the preferred overcoating is at least 3 mils. Thicknesses of this laminated overcoating can vary up to about from 20–40 mils or greater depending upon the desired final product. In making floor tile, for example, the thickness and hardness requirements of the overcoating laminate will exceed those of wallpaper requirements. For those products where performance (image protection) is not as important to the end product, such as would be the case for a graphic poster used in point of sale advertising, an overcoating layer less than 3 mils can be used. Some clear acrylic materials can be applied from conventional coating, spraying and drying means and can be as thick as 0.2 mils in thickness. Materials that would be suitable for the dielectric layer are materials such as non-porous vinyl materials consisting of polyvinylchloride, copolymers of vinylchloride with minor portions of other materials such as vinyl acetate, vinylidene chloride, and other vinyl esters such as vinyl proprionate, vinyl butyrate, as well as alkyl substituted vinyl esters. Although the dielectrics based on polyvinylchloride are preferred, the invention has broad application to other polymeric materials consisting of polyethylenes, cellophane, cellulose proprionate, vinyl acetate, vinylidene chloride, silicone, vinyl esters, alkyl substituted vinyl esters, polyethylenes, polypropylene, epoxies, ormocers, polyacrylates (e.g. polymethylmethacrylate), copolymers of methylmethacrylate such as methyl/n-butyl methacrylate, polybutylmethacrylate, polybutylacrylate, polyurethane, polyamides, polyesters, polystyrene, polycarbonates, paper products, monomers, copolymers and any combinations thereof. Also, monomers, copolymers of any of the foregoing or mixtures of the foregoing if suitable may be used. The dielectric layer of the present process could have a resistivity of at least $10^{12}$ ohm-centimeters. However, it should have a discharge time constant which is longer than the time between deposition and development of the latent image. In addition, the dielectric layer preferably must have inherent adhesive characteristics to bond to toner materials and overcoatings.

While the process of the present invention can be used to produce monochromatic imaged final products, it is particularly suitable for use in a multicolor system. In both monochromatic imaging and in multicolor imaging, the present system is capable of providing up to 32 levels of grey scale.

In a color system a plurality of modified print heads or other latent image depositing means and development stations may be used. Alternatives to print heads that can be used in the present invention are disclosed in copending U.S. patent application Ser. No. 07/769,470. By providing, for example, four ion projection heads coupled with respective color development stations around a conductive drum or endless belt, conventional station-to-station, registration of the images on the dielectric layer is minimized and final registration is done electrically. The dielectric material is wound around the drum or adhered to the endless belt and continuously supplied and removed to and from the system. Dielectric material can be continuously or discontinuously supplied to the system prior to approaching the first imaging station or ion projection head. The dielectric layer should have a thickness of from about 0.2 to about 10.0 mils. After advancing through the imaging and development stations, the final imaged dielectric layer or material is then sprayed with an overcoating which may be a vinyl adhesive overcoating, air dried and removed from the system. Subsequent to removal, the overcoated, imaged dielectric layer is laminated onto a base of about at least 2 mils thick but may be used with a base of any suitable thickness In one embodiment of the invention if it is desired. to produce a final imaged product with depth perception in a electrographic system, a first dielectric layer is imaged and developed as in a monochromatic system, then a second dielectric layer is imaged and developed with a second color and a third or more dielectric layers imaged and developed, etc. The resulting imaged dielectric layers are stacked one over the other before or after removal from then system and the uppermost dielectric layer is laminated a clear overcoating having a thickness of at least 0.2 mils or from 0.2–40 mils and preferably from 3–20 mils. The thickness of the overcoating layer is important because it can provide an abrasion resistant surface to the electrographic images of the laminate structure which might become wall and floor covering. The overcoating layers used can be substantially colorless, can be colored and can be textured or untextured. To enhance the three dimensional characteristics of the final product the printed images can be made in register to the texture of the overcoating.

The electrographic process of this invention for producing an imaged substrate having an image depth perception comprises the following steps:

(a) in an electrographic system dispensing a first dielectric material or layer on a movable conductive means such as a web, belt or drum;

(b) passing this first dielectric layer on the conductive means to an imaging station where a first electrostatic latent image is deposited upon the dielectric layer;

(c) subsequently passing the first latent image formed thereby to a developer station where the first image is developed on said first dielectric layer to form thereby an imaged dielectric surface;

(d) dispensing a second dielectric material or layer above the movable conductive means either directly on the conductive means or on the first imaged dielectric surface, (e) passing a second dielectric layer to an image station where a second electrostatic latent image is deposited;

(f) passing this second electrostatic image to a developer station where the second image is developed on said second dielectric layer to form thereby an imaged dielectric surface;

(g) superimposing and adhering, at any time after development of the first dielectric layer, at least two dielectric layers at least one of which is imaged together (before or after separation) to form thereby a multilayered dielectric substrate having at least one upper and one lower dielectric layer;

(h) continuing steps (a)–(g) for a preselected number of runs;

(i) overcoating at least one imaged dielectric surface during or after steps (a)–(g) above with an overcoating at any time after development of each image.

The overcoating or laminate can be put on any or every imaged dielectric layer or can be applied only to the uppermost or outermost surface of the imaged dielectric layer. The overcoating can be an organic or inorganic light transmitting material or a mixutre of those. By "outermost surface" is intended throughout this disclosure and claims to mean the surface or layer exposed to the external environment. Also, the overcoat can be applied after development of each or selected dielectric layers before or after removal from the system.

"Conducting means" as used in this disclosure and claims includes continuous or discontinuous conductive webs, sheets, belts, drums or mixtures thereof or any other suitable means. In some instances, for example, only a conductive web, drum or belt would be used. In other instances it would be desirable to use a conductive belt or a conductive drum with a conductive web. In other instances all three webs, belts and drums may be desirable. The terms "conductive" or "substrate" are intended to include belts, drums and/or any other means upon which the dielectric layer is deposited, transported and eventually separated and by which an electrical return path to a known potential is provided. In one embodiment of the invention a liquid dielectric formulation is deposited on the upper surface of a conductive drum or continuous belt.

In all of the above-defined procedures, a final high quality imaged and laminated dielectric structure is produced. This final product can then be laminated onto a substrate or base having a suitable thickness for the desired product. For example, if a floor tile was desired, the substrate would be substantially thicker than a wall tile or wallcovering, etc. An appropriate adhesive is applied between product layers to ensure sufficient binding to each other. For best results, drying or evaporation stations are positioned in the system to remove liquids after liquid deposition such as dielectric mixtures, liquid development or adhesive spraying.

EXAMPLES AND PREFERRED EMBODIMENTS

The following are examples of the specific non-impact printing process of the present invention.

EXAMPLE #1

A dielectric vinyl coating made from a formulation consisting of 20% solids of VAGH resin, manufactured by Union Carbide, in a methylisobutylketone solvent (MIBK) was applied to a 3 mil thick stainless steel belt using a knife coater. It was dried in an oven at 130° F. with the resulting thickness being 0.6 mil. The coated stainless steel belt was conveyed past an ac discharge corona to neutralize the surface of the dielectric coating. An S3000 ionographic print head manufactured by Delphax Systems, Mississauga, Canada, in combination with a nitrogen environment was used to apply charge to the dielectric coating. The head was spaced approximately 10 mils above the surface of the dielectric coating. The nitrogen formed an inerting and cooling blanket between the bottom screen of the print head and the dielectric coating.

Pulse width modulation of the head supplied by separate electronics package varied between 0.8 and 2.2 microseconds in 16 equally timed increments as described in Ser. No. 07/540,029. The charge was applied to the dielectric coating in the form of a checkerboard pattern having different levels of charge. The dielectric was then toned with a cyan liquid toner (CPA-04) supplied by the Research Labs of Adelaide, Australia. The toner was at a 4% concentration in ISOPAR G. The developing system used was a three roller type used by the Savin Corp., Stamford, Conn. in the 7450 photocopier, and adapted for this process. After evaporation of the ISOPAR using a combination of heated air and a heated platen on the backside of the stainless steel belt, the surface temperature measured 100° F. The toner was fixed to the surface of the dielectric coating using a 16.7% solids of VAGH resin in a solvent blend of MIBK and methylethylketone (MEK). The process for fixing was spray fixing followed by drying using heated air.

While the dielectric coating was still attached the stainless steel belt it was conveyed through a pair laminating rolls where a 3 mil thick clear rigid polyvinylchloride film made by Klockner Pentaplast, Gordonsville, Va. was applied to the fixed toned surface of the dielectric. The temperature of lamination was 250° F. The total structure was then cooled to ambient temperature and separated from the stainless steel belt.

The resulting film showed distinct blocks of cyan color sandwiched between the dielectric coating and the 3.0 mil rigid polyvinylchloride film having different optical densities and demonstrated the attainment of 16 levels grey.

This electrographically imaged structure can be further processed by laminating the dielectric side of the laminate to a 10 mil thick white vinyl coated board using a conventional flat bed press at 250° F. The laminated structure was cooled down to ambient temperature before it was removed from the press.

The resulting structure is made as a poster typically for use in the graphics art industry.

EXAMPLE #2

The electrographically imaged structure which is separated from the stainless steel belt of Example #1 can be further made into a floor tile structure. In this case, the dielectric coating will be bonded to a 60 mil thick tile base consisting of limestone and vinyl: binders, plasticizers and stabilizers. The decorated laminate removed from the stainless steel belt is subsequently combined with a 2–60 mil thick tile or other base in heated press. The conditions of the pressing are 320° F., 30 seconds and 80 psi. After cooling to ambient temperatures the resulting laminate structure is completely bonded to the tile base with the electrographic image fully intact.

EXAMPLE #3

A 1.5 mil rigid white polyvinylchloride dielectric film made by the Orchard Corp., St. Louis, Mo. was adhered to the stainless steel belt using the same dielectric coating as was applied in Example #1. In this case, before the VAGH coating was completely dried and at a surface temperature at 250° F. on the belt, the 1.5 mil white film applied. The film contained a 0.2 mil coating of the same VAGH resin which was preapplied to the film using conventional rotogravure printing means. After cooling, it was corona discharged and electrographically imaged as in Example #1. The same ionographic head configuration and process that was used in Example #1 was used in this example to image and tone the 1.5 mil white dielectric film. After evaporation of the ISOPAR, the toned image was fixed in a steel over rubber roller fixing nip at a surface temperature of 200° F. The fixing roller was at 125° F. to prevent the toner from lifting from the dielectric surface as it passed through the nip.

The resulting structure was removed from the belt at ambient temperatures and post laminated to the same base in Example #2 to form a tile structure.

EXAMPLE #4

A 10 mil clear rigid polyvinylchloride dielectric film made by Klockner Pentaplast, Gordonsville, Va. was adhered to a stainless steel belt as described in Example #1. The film was imaged and toned using the same configuration and process as described in Example #1. After ISOPAR evaporation, the grey scale configuration was resin in a overcoated with a clear spray of a 16.7% VAGH resin mixture of MIBK and MEK solvents. After evaporation of the solvent using conventional drying means, the imaged and toned structure is removed from the belt after cooling to ambient temperatures.

In a subsequent step, the fixed side of the imaged 10 mil dielectric film is laminated to the surface of 100 mil tile base consisting of limestone and vinyl: binders, stabilizers and plasticizers. The conditions of laminating are the same as described in Example #2. The resulting structure is well adhered to the tile base and is suitable for installation as a floor tile structure in high traffic areas such as shopping malls and the like.

EXAMPLE #5

A 1.5 mil white dielectric PVC film made by the Orchard Corp., was precoated with an 18.5% solids coating of VAGH resin from a suitable solvent solution. The coating was applied at the rate of 0.3 to 0.4 grams/sq. ft. using a rotogravure coater. The surface of the dried coating was continuous, pin-hole free and smooth. The coated film was dispensed from an unwind stand and adhered to a stainless steel belt using heat and pressure in combination with a heated three-roll nip. After bonding the film to the belt, the film measured 90°–100° C. The adhered film plus belt was cooled and conveyed beneath an ac discharge corona where the film was biased positively with 20 volts.

A specially constructed 300 dpi ionographic print head, manufactured by Delphax Systems, Mississauna, Ontario, was used to deposit the latent electrosatic image. A combination of nitrogen and air were used to inert the between the surface of the dielectric film and the bottom, surface of the print head as in Example 1. The head spaced 10 mils above the surface of the dielectric film. Pulse width modulation of the head as described in Example 1 was used to apply the latent electrostatic image to the dielectric film except that instead of 16 equally timed increments, 127 equally timed increments, providing for 127 degrees of control of the resulting optical density, were used. In this case, instead of applying charge to the dielectric layer in the form of a checkerboard pattern, charge was applied to four separate dielectric films which represented four distinct color separations of a scanned full color original. In this case, the original was a color transparency, but other color originals could be used such as: pictures, art, and computer generated graphics. The ultimate end result was a multilayer imaged-toned dielectric structure having 4 different color images, yellow, cyan, magenta, and black which were placed in-register with each other and had visual depth perception which looked better than a color print made from the same color negative and wet chemistry.

The electronic printing system of this invention driven by digital information that was previously generated by scanning a 4-color transparency using a Scitex 300 Response System, manufactured by the Scitex Corporation Ltd., Herzlia, Israel. Four continuous tone (CT) files, one for each of the primary colors plus black were generated and entered into the memory bank of the novel electronics system from magnetic tape. A look up table was generated for each file which assigned charge value to the various optical densities in the color separations.

The CT yellow file now in the form of a maximum of 127 different charge packets was continuously deposited the white dielectric film at a line speed of 15 feet per minute. The voltage corresponding to the areas of greatest optical density in the final print on white pvc film corresponded to 142 negative volts. After yellow toner was. applied, an optical density of 0.85 was measured in this area with an X-RITE Densitometer, Model 404, Grandville. Mich. The lowest negative voltage measured for any colored yellow area of the continuous tone image ws 1.0 volts and this corresponded to 0.05 optical density after toner development. Being a continuous tone yellow image, there were at least 32 levels of yellow color between these two optical densities.

All four toners, yellow, cyan, magenta, and black were manufactured by Hilord Chemical Corporation, Hauppauge. N.Y. The yellow toner, Y39, was applied to the 1.5 mil white film now containing the negative latent electrostatic image at a concentration of 1% in Isopar G. The developing system was of a platen construction and excess Isopar G was removed by a combination of vacuum followed by heat. Heating the yellow toned image on the white pvc film about 70°–100° C. while it was still adhered to the belt allowed for fixing of the yellow toner without distortion of the image. After heating, the film containing the yellow image was cooled to ambient conditions and removed easily from the stainless steel belt. The white rigid pvc film containing the yellow toner image was rerolled on a 3 inch diameter paper core after removal from the belt.

The combination of: the use of a precoated white rigid pvc dielectric film, heating the toned yellow image plus film to a temperature which adheres the toner to the adhesive-coated surface of the film and at which temperature the film is well anchored to the belt thus maintaining the film's stability during heat-fixing, and cooling the toned film sufficiently to separate it from the belt results in a roll or sheet of imaged and toned dielectric which has stability and can be handled in many off-line steps such as post lamination.

The latent electrostatic images for all remaining CT files were applied to a different film using the same printing system, i.e., one 300 dpi ionographic imaging head manufactured by Delphax Systems and one toner developer station. In this case, the film was a 1.0 mil thick clear acrylic film, designated HBS 001, Shinkolite, manufactured by Mitsubishi Rayon Co., Tokyo, Japan. The remaining toners were applied to three separate HBS 001 acrylic films which were individually imaged and developed with liquid toner using the same printing system which was used for imaging and developing the yellow-toned image on the white 1.5 mil pvc film. Each acrylic film was separately dispensed, imaged, toner-developed, heat-fixed, cooled, separated from the conductive belt and either rerolled or cut into individual sheets.

M16 magenta, C2 cyan, and B42 liquid toners, were applied from a 1% concentration in Isopar G and developed as previously described. Where there was charge deposited on the films, the continuous tone images ranged in optical densities from: 0.08 to 1.25 for cyan, 0.05 to 0.77 for magenta, and 0.08 to 1.29 for black. Where there was no charge applied to the films as directed by each of the CT files to the ionographic print head, no negative voltage was measured, no toner was deposited in these areas, and therefore zero optical density was measured. After toner development and heat fixing of the black image on the HB 001 film, and while this film was still adhered to the stainless steel belt, an optional clear adhesive-coated acrylic HB 001 film overlayer was laminated to the toner side or image bearing surface at about 270° F. The dual layer is cooled to ambient conditions, separated from the conductive substrate and rerolled.

At this point in the process, there exists 4 films having 4 separate images or optionally, one of the four imaged films has a clear laminated overlayer. Each image contains printed registration marks which were incorporated in the original CT files when the electronic data was originally generated. This is to provide a means for very precise registration of each of the images prior to lamination whereby individual layers are overlaid in print-register to create a full 4 color print.

A model 6250 industrial 2 roll film laminator manufactured by the General Binding Corp., Northbrook, Ill. was used to laminate all of the films together which in this case were manually placed in print register prior to lamination. The 2 roll laminator was used at a line speed of 10 feet per minute and roll temperatures were set at a temperature of 270° F. A support release sheet was used to convey the films through the laminator so that the heated rolls did not cause image shift and sticking to the surface of the acrylic and vinyl films during lamination. After cooling, the release sheets are removed and the resulting 4 color image with the individual toned layers were adhered together. The resulting full color continuous tone print had high resolution with the visual appearance of a true color photograph and the added feature of depth perception and three dimensionality.

Even though this lamination was done with sheets of 4 color images it is not necessary to limit it to sheets. The same or similar laminators can be used in-line with individual rolls of printed film which are placed in-register to one another to produce the same full color high resolution print.

EXAMPLE 6

In this Example, the same printing system as Example 5 is used with one imaging head and one liquid toner developer station to apply the four different latent electrostatic images and different liquid toners to each film on separate passes. The toner-developer was cleaned between passes prior to the application of the next color. This printing system can include dispensing one dielectric layer and laminating it to the conductive substrate where two or more different images can be sent to the imaging head and each of those images developed with a different colored toner from two or more toner-developer systems all in line with each other. Also, an optional overlayer can be applied over these different and multiple in-line toned images prior to separation from the conductive substrate. When the dispensed film that is imaged is clear, each of the different colored images are cut from this film, placed in register and post-laminated. One outermost surface can contain an optional clear overcoat layer and the opposite surface can be reflective such as would be provided with white or reflective film. In any event, the same full color print having the high resolution and depth perception of Example 5 is produced.

EXAMPLE 7

Instead of using a 1.5 mil pvc film as the dispensed dielectric as described in Example 5, all four of the color separation files were imaged and developed separately on adhesive-coated 1.0 mil Shinkolite HB 001 acrylic film. Prior to separation, a clear overlayer of the same film material was applied to the magenta image print. This magenta print with overlayer became the top layer of the final full color print. The same laminator was used in Example 5 and with slightly higher temperatures. The yellow image now on clear acrylic film was laminated to an adhesive-coated paper having a thickness of 4 mils. The cyan print was placed in print register and heat-laminated to the yellow image now adhered to the white paper as base. The remaining imaged dielectric films were heat-laminated on separate passes in print-register to the preceding color with the magenta image film containing the overlayer being laminated last. Visually, the final result is the same image as in Example 5 except that a non-imaged adhesive-coated paper is adhered in a post lamination step laminated as one of the outermost layers instead of a white, colored or reflective image-bearing dielectric layer which is imaged and developed in-situ in the printing system.

EXAMPLE 8

A 1.5 mil thick white pvc dielectric film was dispensed and heat-laminated to a stainless steel belt at 15 feet per minute as in Example 5. The same yellow CT electronic data file was used to apply the latent electrostatic image. The latent image also containing the required registration mark was toned with Hilord's Y39 toner and fixed as in Example 5. After fixing and removal of excess Isopar G and while the film is at about 100° Centigrade another adhesive-coated Shinkolite HB 001 acrylic film is heat-laminated to the yellow toner image containing surface of the white pvc dielectric film. It is bonded to the yellow imaged surface using a similar 3 roll film laminator. Since the first image on the white dielectric is still adhered to the stainless steel belt during lamination, there is no film or image distortion during lamination of the second dielectric, the clear 1 mil acrylic film.

The structure containing a clear 1 mil non-imaged acrylic upper dielectric layer laminated to the yellow-toned latent electrostatic imaged white pvc is conveyed still adhered to the stainless steel belt around a cooling roll bring the temperature of films below their glass transition temperature, Tg. This is usually below 70° Centigrade for most acrylic films but can vary and is determined by the properties inherent in the dielectric layer being imaged. The films are typically cooled to 50° Centigrade after which the surface of the clear film is neutralized and biased using an ac discharge corona. The yellow registration mark is read by a common reflective registration sensor which sees the yellow registration mark and times the delivery of the second latent electrostatic image from a second 300 dpi ionographic print head. The head is typically protected from Isopar degradation by a combination of air and nitrogen inerting in the space between the surface of the dielectric film and the bottom surface of the print head. The cyan CT file of the original color negative is electrostatically deposited on the 1 mil acrylic film and developed with C2 cyan toner made by Hilord Chemical Co.

The above-described steps are repeated another two, times whereby the magenta and black images are applied onto the composite structure still adhered to the belt. After heat-fixing of the black image, all prints are now in print register with one another while still attached to the belt. While the film is still at elevated temperature and after excess Isopar G is removed from the surface of the last toned latent electrostatic image, a clear 1 mil Shinkolite film is laminated to the toner bearing surface. The film can have an adhesive bearing surface which is heat activated by the laminator. The film can be uncoated and the adhesive coating can be applied using an in-line coating and solvent evaporation means after Isopar removal and prior to film lamination. Also, the surface of the overlayer film can be textured to further enhance the visual attributes of the full color print as well as the performance of the material as would be the case when this laminate structure is a floor or wall tile where enhanced gloss retention and abrasion resistance of the color image is desired.

Optionally, the overlayer can be applied from other means and can be of other forms such as: a radiation cureable coating, a solvent-based coating, an agueous-based coating, a fuseable powder, etc. Also, it can be clear, colored, transparent, translucent, non-polymeric and any of the combinations thereof. In structures where it is desired to laminate a base in place of the clear overlayer, the first dielectric layer that is imaged is clear. Therefore, in a typical case, besides creating a high resolution colored visual with depth perception, the performance of the end use of the image will dictate the type of material, color and surface that will be applied in the overlayer.

After application of the overlayer, the resulting five layers are cooled to ambient conditions and separated from the stainless steel belt. Depending upon the rigidity of the multilayered structure coming from the conductive substrate, the full colored multilayered structure having depth perception is re-rolled or sheeted to size. Also, if the overlayer film has a design texture and/or a three dimensional pattern preapplied into its outermost surface, the imaged layers can be electronically imaged and toned in-register to the pattern texture resulting in an improved manufacturing process for use in many high styled applications such as wall, ceiling and floor coverings, indoor advertising, outdoor posters and greeting cards.

In each of the above Examples 5–8, the lamination as indicated can be applied to at least one imaged dielectric at any time after development of the first imaged dielectric. This can be accomplished before or after removal from the system as shown in FIGS. 6 and 7. Also, any suitable means to deposit a latent image on the dielectric may be used. An ionographic print head was used in each Example 5–8 for illustrative purposes only.

BRIEF DESCRIPTION OF THE DRAWING

FIG. 1 is a schematic side view of a printing system used in the process of this invention.

FIG. 1a is a schematic side view of a coated dielectric layer on a conductive belt or means.

FIG. 1b is a schematic side view of a two-layered dielectric material on the conductive means.

FIG. 1c is a schematic side view of one novel final product prepared by this novel printing system.

FIG. 2 is a schematic side view of a second embodiment used in the process of this invention.

FIG. 2a is a schematic side view of a coated dielectric layer on a conductive belt.

FIG. 2b is a schematic side view of an imaged and toned dielectric layer on a conductive belt.

FIG. 2c is a schematic side view of an overcoated final product prepared by this novel printing system having a clear overlayer.

FIG. 3 is a schematic side view of another embodiment used in the process of this invention and to make the novel structure of the present invention.

FIG. 3a is a schematic side view of an imaged and toned dielectric film adhered to a conductive belt prior to toner fixing.

FIG. 3b is a schematic side view of an imaged and toned dielectric film adhered on the conductive means after toner fixing.

FIG. 3c is a schematic side view of an overcoated final product having a clear overlayer.

FIGS. 4a, 4b and 4c are sectional side views of the novel final product prepared by the above-noted novel printing systems.

FIG. 5 is a schematic side view of a system using a plurality of stations to make a novel multicolor structure of the present invention.

FIG. 5a is a schematic side view of an imaged, toned and fixed coated dielectric material on a conductive belt used in the novel multicolor printing system.

FIG. 5b is a schematic side view of the novel final product prepared by the multicolor printing process of this invention as described in FIG. 2 and when combined with a clear overcoating material.

FIG. 6 is a schematic side view of a further embodiment of the process of this invention using a single means to deposit a latent electrostatic image.

FIG. 6a is a schematic side view of one novel final product having depth perception wherein the overcoating layer is placed adjacent to one of the dielectric layers of the imaged and toned two-layer dielectric structure.

FIG. 6b is a schematic side view of another final product version of FIG. 6a having enhanced depth perception wherein the overcoating layer material is placed on each side of one of the two imaged and toned dielectric layers.

FIG. 6c is a schematic side view of a single toned and imaged dielectric layer adhered to the conductive support which is part of the novel multipass multicolor printing system.

FIG. 6d is a schematic side view of the imaged and toned two-layered dielectric structure adhered to the conductive belt after toner fixing.

FIG. 6e is a side view of the imaged and toned two-layered dielectric structure adhered to the conductive belt prior to toner fixing.

FIG. 7 is a schematic side view of another embodiment of this invention using a plurality of imaging stations.

FIG. 7a is a schematic side view of an imaged, developed, and fixed dielectric layer which is removed as an optional step of the novel single pass multicolor printing system consisting of a plurality of imaging stations.

FIG. 7b is a schematic side view of a final product having novel depth perception consisting of a two-layered imaged and toned dielectric structure with an adhered overcoating layer.

FIG. 7c is a schematic side view of an imaged, toned and fixed two-layer dielectric structure adhered to a conductive belt.

DESCRIPTION OF THE DRAWING AND PREFERRED EMBODIMENTS

For the sake of clarity, several stations are disproportionately illustrated in relation to the entire system. Also, insignificant parts may not be shown.

In FIG. 1 a printing system is shown having an endless stainless steel or other conductive web or belt 1 which is driven by any suitable power means. This belt 1 is entrained about a series of primary rollers 2 and other suitable supporting and guiding structures. The belt 1 is driven through a series of electrographic stations which are generally similar to those used in conventional ionography or xerography, i.e. charge, develop and fixing stations. However, in the present process a substantially thicker dielectric material is used and can be coated on the belt 1 from solution, from a powder or from a liquid formulation. This coating is accomplished at deposition coating station 3. After solution deposition at station 3, the belt 1 with the liquid dielectric formulation thereon is passed through an evaporation chamber 4 where the liquid or solvent of the dielectric formulation is removed, leaving a white or colorless dielectric layer 5 on belt 1. To ensure that layer 5 has a surface free of defects at least one additional thin clear, white or colored dielectric film 10 may be provided at dielectric roll station 6. It is intended that the dielectric 5 deposited at station 3 and the dielectric film 10 supplied at station 6 now provides a final dielectric layer having a thickness of up to about 10.0 mils. Present upon belt 1 now is a two-layered dielectric material including dielectric layer 5 deposited at station 3 and dielectric film 10 deposited at film station 6. The film of dielectric 10 may have a built in adhesive material which can be activated by a heater at film station 6. As will be described below in FIGS. 2 and 3, stations 3 and 6 may be used together or separate from each other in the present system. Once surface defect-free dielectric layers 5 and 10 are deposited on belt 1, the combined dielectric layer is surface discharged by corona discharge 7 to ensure an electrically clean dielectric capable of accepting and retaining the latent image charge. When the "dielectric layer" is referred to in this FIG. 1 it is intended to include layers 5 and 10. Once the dielectric layer has been discharged by any suitable means, it is operatively passed through image station 8 which comprises any suitable apparatus for generating charged particles in image configuration such as ionographic heads, electron guns, image-stencils, pin-matrix, indirect charge transfer means, and mixtures thereof. When "print head" is used throughout this disclosure and drawings, all of these other means for generating charged particles in image configuration are intended to be included. These charges in imagewise configuration are extracted from the print head at station 8 to form the latent electrostatic image on the combined dielectric layers 5 and 10. The novel ionographic print head used in this invention is used in a nitrogen or other inert atmosphere to prevent an exothermic chemical reaction during ionization in air thereby substantially reducing the operating temperature of the print head. This increases the longevity of the print head and provides improved performance. Also, an air knife is used with the ion projection head which will prevent exposure of the ion projection head to toner particles and solvents in liquid toners by purging the space around the ion projection head with solvent-free air or other gases. The dielectric layer containing the latent image is then passed through a liquid toner at development station 9 where the latent image on it is made visible. The novel liquid toner and overcoating compositions used in the present invention comprise a resin of the same or different families as the resin used in dielectric layers 5 and 10. Materials that are suitable for the dielectrics, toners and overcoatings of this invention are disclosed in U.S. Pat. No. 5,162,141 issued Nov. 10, 1992. In one embodiment, by using the same family of resins in both the toner and the dielectric, there is greater adhesion of the toner particle to the dielectric layer. However, equally good results are obtained by using different materials in the dielectric, toner-developer and overcoatings of this invention. After toning or developing the toned image is then passed under a heated platen 11 to evaporate the ISOPAR and/or as noted above, other solvent from the liquid toner. ISOPAR is a registered trademark of EXXON. The dielectric layer is then passed through heat or pressure fix nip rolls 12 where the toned image is set or fixed to the dielectric. The adhesive resin used in the toner in addition to the above purpose, helps the toned particles adhere to each other. The dielectric layer with the image fixed or set at rollers 12 is then advanced to station 14 where an adhesive coating is placed on the imaged surface of the dielectric layer. This adhesive allows the clear base layer or overcoating 15 to bind to the imaged dielectric layer. At station or hood 18 the liquid of the adhesive is removed prior to coating of clear overcoating 15 on the dielectric layer. A clear overcoating 15 polyvinylchloride or other suitable material is supplied from spool or reel 13. This overcoating 15, a light of transmitting material which could be organic or inorganic, in addition to maintaining the integrity of the image, prevents shrinkage of the dielectric layer after drying. Any suitable overcoating may be used such as non-porous vinyl materials comprising polyvinylchloride, vinyl acetate, copolymers of vinylchloride with minor portions of other materials such as vinylacetate, vinylidene chloride, and other vinyl esters wuch as vinylproprionate, vinylbutyrate as well as alkyl substituted vinyl esters. Although the overcoatings based on polyvinylchloride are preferred, the invention has broad application to other polymeric materials comprising polyethylenes, polyacrylates (e.g., polymethylmethacrylate), copolymers of methylmethacrylate such as methyl/n-butylmethacrylate, polybutylmethacrylate polybutylacrylate, polyurethanes, polyamides, polyesters, polystyrene and polycarbonates. Also, copolymers of any the foregoing or mixtures of the foregoing may be used. Some other filming overcoating matrials, if suitable, can be used from films such as polyvinylchloride, vinyl acetate, vinylidene chloride, polyurethanes, vinyl esters, alkyl substituted vinyl esters, polyethylenes, polyesters, polyacrylates, copolymers or mixtures thereof. The resulting layer is advanced to rollers 17 fixing the clear overcoating or base layer 15 in position onto the dielectric layer. In a color system the above process is repeated with sequential color stations until the desired colored image is obtained before overcoating. The resulting overcoated dielectric layer may be used as a final product or may be combined after separation station 19 with other substrates in post process steps. For example, for the graphic arts industry, the overcoating may be clear and a thin 0.5 mil film either applied as shown from station 13 or from a formulation or as a formulation that may be applied using conventional coating, liquid or powder, spraying and drying and/or curing means. In a floor tile the outermost surface could be textured to enhance the visual three dimensionally and the wear performance of the product. In addition, a thicker opaque substrate such as would be used in the manufacture of floor and wall covering, wallpaper, fabric, tile base or the like may be adhered to the under surface (non-imaged surface) of dielectric layer using post-processing steps. This ranges from a paper thickness of 4.0 mils up to 1 inch in thickness for a ceiling tile product. After passing through rollers 17 where overcoating 15 is adhered to the dielectric layer, the resulting combined layer is passed through cooling rollers (or other means) 16, and then to cooling and separation roller where the final product is separated from belt 1. The final product or base layer 20 is separated from belt 1 by heating or any other suitable means to separate it from belt 1. This generally occurs at 38° C. or less when using the dielectric materials of this invention. These dielectric materials include non-porous vinyl films comprising polyvinylchloride, copolymers of vinylchloride with minor portions of other materials such as vinyl acetate, vinylidene chloride and other vinyl esters such as vinyl proprionate, vinyl butyrate, as well as alkyl substituted vinyl esters. Although the dielectrics based on polyvinylchloride are preferred, the invention has broad application to other polymeric materials consisting of: polyethylenes, polyacrylates (e.g. polymethylmethacrylate), copolymers of methylmethacrylate such as methyl/n-butyl methacryl polybutyl methacrylate, polybutylacrylate, polyurethane polyamides polyesters, polystyrene and polycarbonates and paper products. Also, monomers, polymers or mixtures of the foregoing may be used. These materials can be used for the dielectric 5 of the dielectric film 10 and they can be the same or different. For materials which are formulated to be subsequently heat reactivated type of adhesives as well as dielectrics, separation from belt 1 can be enhanced through the use of thin release coatings such as Teflon FEP which are a permanent part of the upper surface of the conductive belt 1. Teflon is a registered trademark of Dupont. As earlier noted, the toned image can be fixed at station 12 by pressure, heat, spray, or other suitable fixing methods. In any of these fixing methods, especially in a multicolor system, the toner particle must be fixed without substantially distorting the toner particle or the diameter of the toner particle. This is important to maintain optimum color quality and resolution of the final color image.

The final product 20 removed at station 19 comprises a dielectric layer 5, a second dielectric layer 10 and an overcoating or base layer 15. The combined thickness of layers 5 and 10 is from 0.2 to about 10.0 mils and thickness of the overcoating layer 15 is from about 0.2 to about 40 mils.

The thickness of the overcoating, i.e. 0.2 to 40 mils is important to the structure of the present invention. At least 0.5 mils of a suitable overlayer is required to stabilize the dielectric layer, less than 0.5 mils of overcoating does not provide the desired structural strength to the thin dielectric layer. When a floor covering final product is desired, from 2.0–40 mils of overcoating provides the abrasion resistance required: over 40.0 mils would be as effective, however would be an overkill since 40.0 mils is more than adequate to provide the necessary protection the decorative imaged dielectric layer and the necessary abrasion resistance for even floor tile.

In FIG. 2 a dielectric solution or dielectric liquid formulation is coated at station 29 upon an endless conductive belt 1. The liquid formulation is controlled such a manner that upon evaporation of the solvent or liquid therefrom a dielectric layer 23 having a thickness of about 0.2 to about 10.0 mils remains on belt 1 and the surface is free of defects. The solvent or liquid is removed by passing the dielectric solution or formulation through an evaporation chamber 21. Once the 0.2 to about 10.0 mil dielectric coating is achieved, the surface is electrically discharged by the use of a discharge corona 22 or other suitable means. After being discharged the dielectric layer 23 is charged in image configuration at station 30 by the same means as described in relation to FIG. 1. As the dielectric layer 23 progresses forward bearing with it the latent image, it passes through a developer station 24 where the latent image is toned and made visible. The liquid from the developer is removed and the toned image fixed by any appropriate means such as pressure, heat or spray fixing at fixing means 25. After it is passed through the developer station 24 including heated platen 24a, the toned imaged dielectric 23 is passed through fixing rollers 25. At station 26 an adhesive is applied on the imaged surface of dielectric layer 23 and this adhesive is dried at drying means 27. The adhesive now is tacky and ready to adhere to a clear overcoating 31. This overcoating is applied from an overcoating supply 31 such as polyvinylchloride. The adhesive applied also helps lock the toner into the surface of the dielectric and the application of the clear overcoating 31 encapsulates the toner between the dielectric layer 23 and the overcoating 31. The overcoating 31 not only combines with dielectric layer 23 but also prevents shrinkage of the dielectric layer 23. The combined layer is passed through heating rolls 34 and hence to cooling rolls 32 and 33 and subsequently removed as the final product at separation roll 33 (which also is a cooling roll).

The endless belt 1 is then continuously moved to an appropriate cleaning station 35 to remove any debris and is now ready to accept another layer of dielectric at coating station 29.

In FIG. 3 the same sequence of steps as described in FIG. 2 is followed except that rather than a dielectric solution deposited at 29 in FIG. 2 upon the endless belt 1 in FIG. 3, a spool 36 of a film dielectric material supplies the dielectric layer 37 to the surface of belt 1. This film 37 also can have a thickness of 0.2 to 10.0 mils and preferably is 0.2 to 1.5 mils. Film 37 is adhered belt 1 by any appropriate means and the film electrically discharged at station 38. Film 37 may have an adhesive applied if desirable. The dielectric film 37 is then image charged at station 39 (by the same method as in FIGS. 1 and 2) toned or developed at developer station 40, toner is fixed at fixing rollers or station 41. After the toner is fixed in place, the imaged film 37 is advanced to station 42 where an adhesive is applied over the imaged surface of film 37. This adhesive allows the clear overcoating to bind to the imaged dielectric layer 37. After any liquid is removed from the adhesive to make the adhesive tacky at station 43, the imaged layer 37 with the surface adhesive is advanced to station 44 where a clear overcoating 45 is applied from overcoating spool or supply 46. The overcoated film is then passed through heating rollers 47 where the overcoating 45 is firmly pressed and fixed to the imaged dielectric layer 37. The film is then advanced to cooling roller 48 and separation roller 49 where the final product 50 is removed from belt 1. The endless belt 1 then is cleaned by cleaning blade or other means 51 and is ready for accepting another film coating of dielectric material and circulation through another "imaging cycle", i.e. imaging, developing, fixing and removal cycle.

In FIG. 4a a cross-sectional side view of the final product 20 described in FIG. 1 is illustrated. The final product of the systems of FIGS. 2 and 3 would be similar to the product of FIG. 4 except they would not have two dielectric layers 5 and 10. In FIG. 2 the final product would have only layer 23 and in FIG. 3 the final product would have only layer 37. This product 20 is the result of the present system when the system of FIG. 1 is used in the multicolor mode. When more than one color toner 52 is deposited upon dielectric layer 10, each toner particle 52 has a built-in resin adhesive which permits it to adhere to the dielectric layer 10 and to each other. The clear polyvinylchloride overcoating 15 of from about 0.5–40 mils thick helps encapsulate the toner and provides image and dielectric structural stability. In addition, the overcoating 15 minimizes shrinkage of the dielectric layers 5 and 10. A base or substrate may be laminated to the surface of dielectric 5 to form a composite final product such as a tile or wallcovering. Any decorative image can be electrographically supplied thereby to any substrate used for tile, wallpaper, ceiling or floor products.

In FIG. 4b a cross-sectional side view of the final product of FIGS. 2 and 3 is illustrated. In both FIGS. 2 and 3 only one dielectric layer is used, i.e. layer 23 in FIG. 2 and layer 37 in FIG. 3. Both final products however will look the same, thus FIG. 4b shows a dielectric layer 23 with a clear overcoating layer 31. In between layer 23 and layer 31 is the fixed toner particles 52.

In FIG. 4c a cross-sectional side view of the final product of FIG. 1 is illustrated having a substrate 70 (such as tile or wallpaper) attached to the non-imaged surface of dielectric layer 5. An adhesive may be placed between any of the layers 15, 10, 5 and 70 if desired to improve adhesion. When an adhesive is used it must be clear and not interfere with the visual or chemical properties of any of the layers. Substrate 70 is merely adhered to the non-imaged surface of the dielectric by placing an adhesive between layers 5 and 70 and pressing together. Any suitable means may be used to connect substrate 70 to the surface of the dielectric layer opposite to that surface adjacent to overcoating layer 15 and can be textured randomly or register with the print to enhance the visual three-dimension and the wear performance of the product. An additional station such as a substrate station may be positioned in the systems of FIGS. 1, 2 or 3 at any location that is convenient, preferably subsequent imaging the dielectric.

In all of the described figures, means can be used to recycle the dielectric layer to the same print head for at least a second imaging at a point after the first image fixing. This embodiment would be used in lieu of the multistation system shown in FIG. 5. Therefore, each of the systems shown in FIGS. 1, 2 and 3 can have any conventional means to recycle the dielectric layer (after a first image fixing) through the same stations, i.e. imaging station or print head, developer station, developer or toner liquid removal station, toner fixing station and lamination or overcoating station.

FIG. 5 shows an imaging or printing system similar to that described in FIG. 2 except in FIG. 5 a plurality of toning or developing stations are shown. In FIG. 5 a liquid dielectric is coated upon endless belt 1 at coating station 52 and the liquid evaporated off at drying chamber 53. A dielectric layer 54 up to about 10.0 mils now remains on belt 1. This layer 54 is then surface discharged at corona discharge 55 and image charged at print head 56. The latent image formed at 56 is then passed to a first developer station 57 where a liquid toner of a first color is applied. The liquid from this toner is removed at drying means 58 and the resulting toned image fixed at fixing nips or rollers 59. The imaged dielectric layer 54 is then passed through print heads 71, 72 and 73 which create latent images colorwise and through developer stations 60, 61 and 62 where different colored toners are applied and each fixed at fixing rollers 59. Each toner at stations 57, 60, 61 and 62 will selectively respond to selective latent images created by print heads 56, 71, 72 and 73 on dielectric layer 54. The finally imaged dielectric layer is then advanced to station 63 where an adhesive is applied to the image surface and at station 64 any liquid is removed from the adhesive making it tacky and ready to be combined with a clear overcoating 65. The overcoating 65 is pressed onto adhesive layer 54 and heated at rollers 66. A cooling roller 67 removes any heat from the resulting layered structure and this resulting structure passed to cool-separation rollers 68 where product 69 is removed from belt 1. Belt 1 is then cleaned and prepared for another run or cycle.

In FIG. 6, 6A and 6B a system which has the same or similar sequence of steps as described in FIG. 3 is followed except in FIG. 6 overcoating at 47 and removal at separation station 49 is optional. Also, a rotary cutter 78 is provided near the film dispensing means 36 to cut the dielectric layer upon demand. This cutter 78 provides optional means for supplying a plurality of dielectric layers 37 one above the other. In other words, the first dielectric layer 37 is deposited on belt 1, it is cut (optionally) at rotary cutter 78 and passed through all of the stations 39, 40 and 41. It is optionally overcoated via overcoating 45 at spools or rollers 47. Then the overcoated or non-overcoated image developed and fixed dielectric 37 is recirculated (through optionally inactive separation station 49) back to dielectric dispensing rollers 80 where a second dielectric layer 44 is deposited over the first dielectric layer 37. This process is continued until the desired number of dielectric layers are deposited, each being optionally overcoated via overcoating roll 46 and overcoating heated rollers 47. The overcoating rollers 47 and separation rollers 49 are individually activated or inactivated upon demand depending on whether it is desired to overcoat a dielectric layer or remove a dielectric layer. Thus, the dielectric layers of FIG. 6 can be overcoated before or after removal from the system illustrated in FIG. 6. Also, the laminated or overcoating 45 can be applied on any or every imaged dielectric layer as desired. Roll 36 alternatively could be a dispenser of sheets of dielectric film or dielectric paper, a coater of dielectric material or a dielectric powder applicator if desired. In the case of film or paper or any combinations theeof, they can be coated with an overcoating or an adhesive or can uncoated. The adhesive could assist in the final performance of the system and process. In the other instances of dispensing, it is obvious to those skilled in the art that the proper means of heating, curing and cooling is required to render the dielectric capable of accepting a latent electrostatic charge from charging station 39. The cutter 78 or any other suitable means allows the web or film of dielectric 37 or 44, etc. to be cut to any desired length while attached to the conductive substrate 1. The cut should be made over an insulated section of the conductive belt 1. Alternatively, the head (or means) 39 must be gated when the conductive belt 1 with a gap in the dielectric layer approaches the head 39 to prevent ion head damage. The toner or developer at station 40 could be one color could use different colored toners when desired on each pass. Alternatively, developer 40 could consist of multiple developers each containing a different colored toner and activated on each subsequent pass. The toners can be of the same family of materials as the dielectric layer or can be completely different materials from those in the dielectric layer or appropriate adhesives can be used. The rotary cutter 79 is used to cut film web 45 to optionally supply clear overlayer 45 onto the imaged and toned dielectric. The overcoating 45 can be of different thickness and can include vinyl, polyester, acrylic, polyethylene, polyurethane or other suitable materials. Also, overcoating 45 can be, if desired, an adhesive coated film applied in a prior step or coated in line with coater 42. Alternatively, the coating can consist of liquid resins, powders and aqueous media which is dried or cured to form a suitable overlayer. On the second (or subsequent passes) pass, a new dielectric layer 44 is applied over toned and imaged dielectric 37, each with or without optionally applied overcoating 45. Overcoating 45 and/or dielectric layers 44 can be the same or different as previous overcoatings or previous dielectric layers as desired. Cleaning blade 51 need not be used when recycling dielectric layers 37 and 44, etc. Blade 51 and belt separation device 52 are used to clean the belt 1 and remove the imaged dielectric layer(s) only after the last desired pass of a dielectric layer(s). In FIG. 6 the overcoating 45 optionally can be applied to each or all dielectric layers before or after removal from the system. Alternatively, the outermost surface can be textured.

FIG. 6A shows two imaged dielectric layers 37 and 44 with an overcoating 45 on layer 44, whereas FIG. 6B shows each dielectric layer 37 and 44 (and any subsequent dielectric layers) each overcoated with an overlayer 45. As many dielectric layers as desired may be used each or any may be overcoated or not as is required.

In FIG. 7 a system which has the same or similar sequence of steps as FIG. 5 is followed except in FIG. 7 a dielectric removal means 70 and subsequent second and imaged or non-imaged dielectric dispensing means 75 are used. In FIG. 7, after dielectric layer 54 is imaged, developed and fixed it and subsequent imaged dielectrics can be removed from the system and post system overcoated and superimposed and laminated or optionally can remain on belt 1 (not removed at 70) and a second or third, etc. dielectric deposited over it to be imaged, developed, fixed and overcoated. Removal stations 81–70 and additional dielectric dispensing stations 75–82 can be located in the system of FIG. 7 after each developer station 60, 61 and 62 (and drying station 58), if desired. Thereby imaged dielectrics removed at stations 81–70 can be post system overcoated or optionally can remain in system through inactive removal stations 81–70 and dielectric layer stacked with each layer overcoated at 65–66 or selectively overcoating just the outermost dielectric layer at 65–66. Thus, FIG. 7 shows a system where imaged dielectric layers can be overcoated before or after removal from the system.

In both FIG. 6 and FIG. 7 after the dielectric layers are optionally removed from the systems, they are stacked in print registration one over the other and laminated by passing the stacked structure through a suitable laminator such as a model 6250 industrial 2 roll film laminator manufactured by the General Binding Corp., Northbrook, Ill. However, any other suitable laminator may be used such as is known in the art. When the stacked or individual dielectrics are overcoated in the system before separation, the laminator means disclosed in the drawings or other suitable lamination means such as a three roll laminator are employed.

The novel imaged product 20, for example, as shown in FIG. 1 comprises a layer 15 having a thickness of up to one inch, an imaged dielectric layer 5 having a thickness of about 0.2 to 10.0 mils, and a clear resinous overcoating 19 having a thickness of about 0.2 to 40.0 mils. The resins in the dielectric layer 5 and the resins in the toner used develop the image are in one embodiment from the same chemical family. By the "same chemical family" is meant those materials that are made from the same moiety, for example, vinyl in polyvinylchloride and polyvinyl acetate. At least one of these layers must be "reflective". By "reflective" is meant to return a substantial portion of the ambient illumination.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. An electrographic process for producing an imaged substrate having an image depth perception comprising the following steps:
    (a) in an electrographic system dispensing a first dielectric layer on a movable conductive means;
    (b) passing this first dielectric layer on the conductive means to an imaging station where a first electrostatic latent image is deposited upon the dielectric layer;
    (c) subsequently passing the first latent image formed thereby to a developer station where the first latent image is developed on said first dielectric layer to form thereby a first imaged dielectric surface;

(d) subsequently dispensing a second dielectric layer on top of said first dielectric layer;

(e) passing said second dielectric layer to an imaging station where a second electrostatic latent image is deposited thereon;

(f) passing this second electrostatic image to a developer station where the second image is developed on said second dielectric layer to form thereby a second imaged dielectric surface;

(g) superimposing and adhering at least two of the resulting dielectric layer together, at least two of which are image-developed to from thereby a multilayered dielectric structure;

(h) continuing step (a)–(g) for a preselected number of runs;

(i) overcoating at least one imaged dielectric surface at a time after development of said first latent image; and (j) removing said multilayered dielectric structure at a time after development of said second dielectric layer.

2. The process of claim 1 wherein said steps are carried out at a temperature from about 70°320° F.

3. The process of claim 1 wherein steps (a), (b), (c) and (d) are repeated at least two times.

4. An electrographic process for producing an imaged substrate having an image depth perception comprising the following steps:

(a) in an electrographic system dispensing a first dielectric material or layer on a movable conductive means;

(b) passing this first dielectric layer on the conductive means to an imaging station where a first electrostatic latent image is deposited upon the dielectric layer;

(c) subsequently passing the first latent image formed thereby to a developer station where the first image is developed on said first dielectric layer;

(d) subsequently dispensing a second dielectric material or layer on top of said first dielectric layer;

(e) passing said second dielectric layer to an imaging station where a second electrostatic latent image is deposited;

(f) passing this second electrostatic image to a developer station where the second image is developed on said second dielectric layer and removed from the system;

(g) continuing steps (a)–(f) for a preselected number of runs;

(h) superimposing and adhering at least two resulting dielectric layers together at least two of which are imaged-developed to form thereby a multilayered dielectric structure having at least one developed upper and one developed lower dielectric layer;

(i) overcoating at least one upper dielectric layer and subsequently removing said multilayered dielectric structure from said system; and (j) removing said multilayered dielectric structure at a time after development of said second dielectric layer.

5. The process of claim 4 wherein said steps are carried out at a temperature from about 70°–320° F.

6. The process of claim 4 wherein steps (a), (b), (c) and (d) are repeated at least two times.

7. An electrographic process for producing an imaged substrate having an image depth perception comprising the following steps:

(a) in an electrographic system dispensing a first dielectric material or layer on a movable conductive means;

(b) passing this first dielectric layer on the conductive means to an imaging station where a first electrostatic latent image is deposited upon the dielectric layer;

(c) subsequently passing the first latent image formed thereby to a developer station where the first image is developed on said first dielectric layer;

(d) passing the dielectric layer containing this first image to a separation station where said dielectric layer is removed from the system;

(e) dispensing a second dielectric material or layer on the movable conductive means;

(f) passing said second dielectric layer to an imaging station where a second electrostatic latent image is deposited;

(g) passing this second electrostatic image to a developer station where the second image is developed said second dielectric layer and removed from the system;

(h) continuing steps (a)–(g) for a preselected number of runs;

(i) superimposing and adhering at least two resulting imaged-developed dielectric layers together to form thereby a multilayered dielectric substrate having at least one upper and one lower dielectric layer; and subsequently (j) overcoating at least said upper dielectric layer.

8. The process of claim 7 wherein said steps are carried out at a temperature from about 70°–320° F.

9. The process of claim 7 wherein superimposing and adhering at least two imaged-developed dielectric layers together to form a multilayered dielectric structure is carried out subsequent to removing at said dielectric separation station.

10. The process of claim 7 wherein steps (a), (b), and (d) are repeated at least two times.

11. An electrographically imaged medium comprising a base substrate, at least two electrographically imaged dielectric layers, and at least one overcoating layer, said base substrate having positioned thereover said dielectric layers, said dielectric layers having a resistivity of at least $10^{12}$ ohm centimeters and capable of retaining an electrostatic charge pattern, each dielectric layer having a thickness of at least 0.2 mils and each comprising at least one colored image different in color from other images on other dielectric layers in said imaged medium, an outermost imaged dielectric layer having on at least an outermost surface an overcoating layer, and said overcoating layer having a thickness of from about 0.2–40 mils.

12. The imaged medium of claim 11 wherein said overcoating layer comprises a light transmitting material.

13. The imaged medium of claim 11 wherein said overcoating layer comprises as said outermost surface a textured material.

14. The imaged medium of claim 11 wherein at least one of the layers is reflective and has a thickness of at least 0.2 mils.

15. The imaged medium of claim 11 comprising a base layer, at least two dielectric layers, and at least one overcoating layer, said dielectric layers having at least one developed electrographic image thereon comprising at least one color, one dielectric layer abutting on its lower face said base layer and on its upper face at least one additional dielectric layer, said lower face having an adhesive in contact therewith to provide fixing to said base layer, and at least one dielectric layer having an overcoating comprising a substantially clear material having a thickness of from about 0.2–20 mils.

16. The imaged medium of claim 11 comprising a plurality of dielectric layers, said dielectric layers being light transmitting and each containing at least one electrographically deposited visible image thereon, said dielectric layers being layered one over the other in substantial image registration.

17. The imaged medium of claim 11 comprising a plurality of dielectric layers, said dielectric layers being colored and each containing at least one electrographically deposited visible image thereon, said dielectric layers being layered one over the other in substantial image registration.

18. The imaged medium of claim 11 wherein said developed electrographic image comprises colored toner materials comprising a built-in adhesive, said adhesive adapted to permit separate toner particles to bond to each other and to said dielectric layer.

19. The imaged medium of claim 11 wherein said overcoating layer comprises on said outermost surface a textured material wherein said material is in substantial registration to the image.

* * * * *